United States Patent
Griffin et al.

(10) Patent No.: US 9,270,077 B2
(45) Date of Patent: Feb. 23, 2016

(54) LASER WITH A SELF-MONITORING CONTROLLED OPTICAL COMPONENT SYSTEM

(71) Applicant: The Boeing Company, Chicago, IL (US)

(72) Inventors: Steven F. Griffin, Kihei, HI (US); Jed E. Donaldson, Bernallilo, NM (US); Jeffrey T. Baker, Albuquerque, NM (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 14/242,334

(22) Filed: Apr. 1, 2014

(65) Prior Publication Data

US 2015/0280390 A1   Oct. 1, 2015

(51) Int. Cl.
*G08B 21/00* (2006.01)
*H01S 3/105* (2006.01)
*H01S 3/16* (2006.01)
*H01S 3/107* (2006.01)
*H01S 3/139* (2006.01)

(52) U.S. Cl.
CPC .............. *H01S 3/105* (2013.01); *H01S 3/107* (2013.01); *H01S 3/1398* (2013.01); *H01S 3/16* (2013.01); *H01S 3/1394* (2013.01)

(58) Field of Classification Search
CPC ........................................................ H01S 1/00

USPC ............ 340/635, 540; 73/769; 310/311, 314, 310/319

See application file for complete search history.

(56) References Cited

U.S. PATENT DOCUMENTS 5,578,761 A    11/1996   Clark, Jr. et al.

OTHER PUBLICATIONS

Dosch, J.J. et al., "A Self-Sensing Piezoelectric Actuator for Collocated Control," *J. of Intell. Mater. Syst. and Struct.*, vol. 3, pp. 166-185 (1992).

Chaudhry, Z. et al., "Local-area health monitoring of aircraft via piezoelectric actuator/sensor patches," *SPIE*, vol. 2443, pp. 268-276 (1995).

*Primary Examiner* — Jeffrey Hofsass
(74) *Attorney, Agent, or Firm* — Dan Brecht

(57) ABSTRACT

A self-monitored controlled optical component system may include an electrostrictive actuator, a capacitor matched in capacitance to the electrostrictive actuator, a current source connected to the electrostrictive actuator and to the capacitor that supplies an electric current to the electrostrictive actuator and to the capacitor, an optical element connected to be moved by the electrostrictive actuator, and a comparator connected to receive a first output current from the electrostrictive actuator and a second output current from the capacitor, and output a differenced sensoriactuator signal proportional to the difference between the first output current and the second output current, the sensoriactuator signal representing a current associated with movement of the optical element by the electrostrictive actuator.

19 Claims, 4 Drawing Sheets

LASER WITH A SELF-MONITORING CONTROLLED OPTICAL COMPONENT SYSTEM

STATEMENT OF GOVERNMENT INTEREST

This invention was made with U.S. Government support under (IROSS FA9451-05-C-0257) awarded by the Department of Defense. The government has certain rights in this invention.

TECHNICAL FIELD

The disclosure relates to diagnostic systems and, more particularly, to systems for self-diagnosing or monitoring optical components.

BACKGROUND

Controlled optical component systems include an optical component, such as a mirror, that is controlled by an actuator. The actuator may be an electrostrictive actuator, which may include a dielectric that changes its shape under application of an applied electric field. A common form of electrostrictive actuator is a piezoelectric actuator. In some applications, the electrostrictive actuator may take the form of a piezoelectric stack actuator ("PZT"), which is a stack of individual piezoelectric actuators. The purpose of the stack is to magnify the displacement effect of the individual piezoelectric actuator in response to the applied electric field. The mirror may be bonded to the end of the PZT so that it moves when the PZT is actuated.

Such optical component systems may comprise the only moving part of a laser, such as a Frequency Addition Source of Optical Radiation (FASOR) sodium guidestar laser. The optical component systems are used to actively control the laser cavity dimensions.

A problem inherent in such controlled optical component systems is that, in the event of a laser system malfunction, it is necessary to completely dismantle the controlled optical component system in order to determine the cause of the malfunction. Accordingly, there is a need for a self-monitoring controlled optical component system that provides an indication of the nature of a malfunction without need of dissembling the controlled optical component system, or removing the controlled optical component from the system, such as a laser, in which it is mounted.

SUMMARY

In an embodiment, a self-monitoring controlled optical component system may include an electrostrictive actuator, a capacitor matched in capacitance to the electrostrictive actuator, a current source connected to the electrostrictive actuator and to the capacitor that supplies electric current to the electrostrictive actuator and to the capacitor, an optical element connected to be moved by the electrostrictive actuator, and a comparator connected to receive a first output current from the electrostrictive actuator and a second output current from the capacitor, and output a differenced sensoriactuator signal proportional to the difference between the first output current and the second output current, the sensoriactuator signal representing a current associated with movement of the optical element by the electrostrictive actuator.

In another embodiment, a sodium guidestar laser may include an optical cavity, a mirror mounted at an end of the optical cavity, a piezoelectric actuator attached to the mirror, the mirror and piezoelectric actuator forming a controlled optical component system, a capacitor matched to the piezoelectric actuator in capacitance, a current source connected to the piezoelectric actuator and to the capacitor that supplies an electric current to the piezoelectric actuator and to the capacitor at a frequency that varies over a pre-set frequency range such that the mirror moves when the piezoelectric actuator is actuated by the electric current, a comparator connected to receive a first output current from the piezoelectric actuator and a second output current from the capacitor, an output of differenced sensoriactuator signal proportional to the difference between the first output current and the second output current, the sensoriactuator signal representing a current associated with the piezoelectric actuator moving the mirror, and a display device connected to receive the sensoriactuator signal and display a baseline signature, and provide a real time transfer function to display the sensoriactuator signal as a transfer curve indicative of a condition of the controlled optical component system.

In yet another embodiment, a method for self-monitoring a controlled optical component system of a type having an electrostrictive actuator coupled to an optical component may include passing a current from a current source through the electrostrictive actuator and through a capacitor connected to the current source and matched in capacitance to the electrostrictive actuator, receiving a first output current from the electrostrictive actuator and a second output current from the capacitor, and outputting a differenced sensoriactuator signal proportional to the difference between the first output current and the second output current, the sensoriactuator signal representing a current associated with movement of the optical component by the electrostrictive actuator, applying a transfer function to the sensoriactuator signal, and displaying the sensoriactuator signal as a transfer curve indicative of a condition of the controlled optical component system, and comparing the transfer curve to a baseline transfer curve to determine a condition of the controlled optical component system.

Other objects and advantages of the disclosed self-monitoring controlled optical component system will be apparent from the following description, the accompanying drawings, and the appended claims.

DETAILED DESCRIPTION

Figure 1:
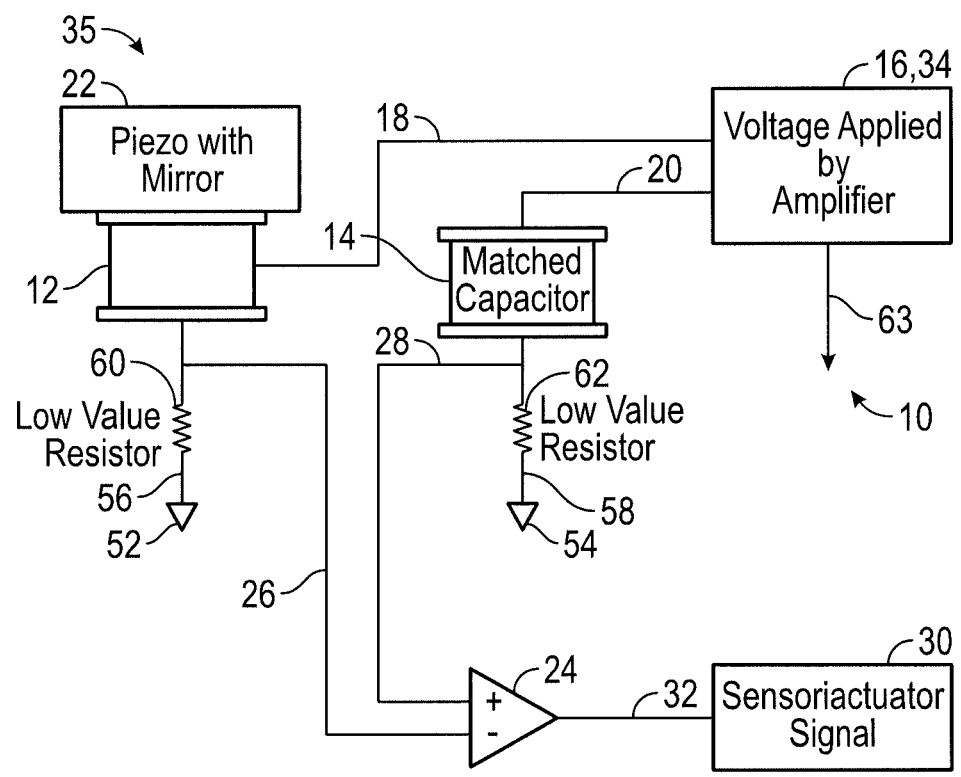
FIG. 1 is an embodiment of the disclosed self-monitoring controlled optical component system.

As shown in FIG. 1, in an embodiment, the self-monitoring controlled optical component system, generally designated 10, may include an electrostrictive actuator 12, a capacitor 14, and a current source 16 connected to the electrostrictive actuator 12 and to the capacitor 14 by conductors 18, 20, respectively. An optical element 22 may be connected to be moved by the electrostrictive actuator 12. A comparator 24 may be connected to receive a first output current from the electrostrictive actuator 12 over conductor 26 and a second output current from the capacitor 14 over conductor 28. A display 30 may be connected to receive a sensoriactuator signal over conductor 32 from comparator 24. In an embodiment, the capacitor 14 may be matched in capacitance to the electrostrictive actuator 12. In an embodiment, the current source 16 may be an amplifier, and in an embodiment, may take the form of the power source 34 for the controlled optical component 35, which may consist of the electrostrictive actuator 12 and the optical element 22.

In an embodiment, the comparator 24 may be an operational amplifier and may take the form of a differential amplifier. The comparator 24 may output a differenced sensoriactuator signal that may be proportional to the difference between a first output current from the electrostrictive actuator 12, received by the comparator over conductor 26, and a second output current over conductor 28, received by the comparator from the capacitor 14. The sensoriactuator signal that is transmitted over conductor 32 may be proportional to the difference between the first output current and the second output current. Accordingly, the sensoriactuator signal may represent a current associated only with movement of the optical element 22 by the electrostrictive actuator 12, because the current associated with the inherent capacitance of the electrostrictive actuator 12 is subtracted by the comparator 24 as a result of receiving the output current of the matched capacitor 14.

Figure 2:
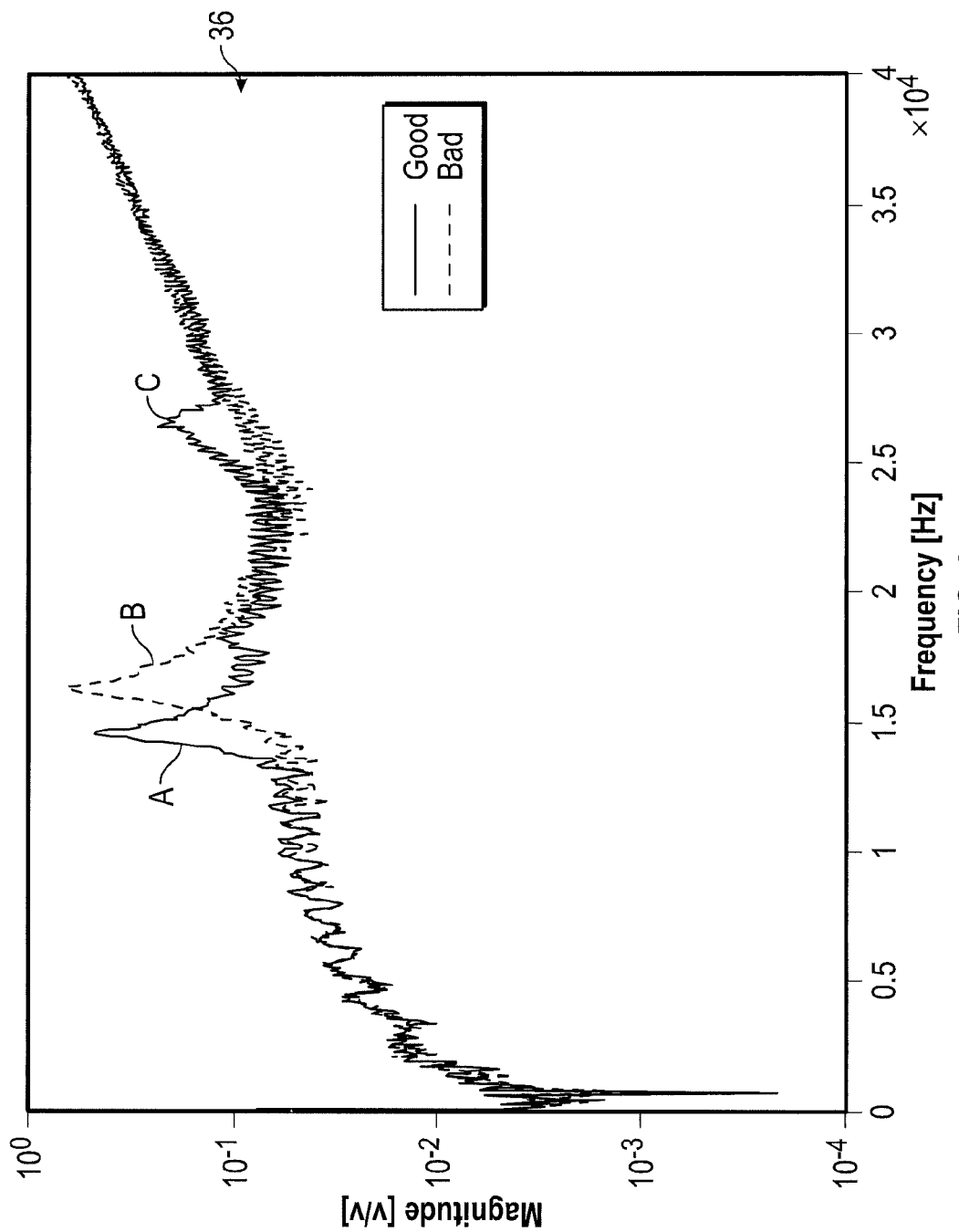
FIG. 2 is a display of a transfer curve displaying frequency response over a pre-set frequency range of the system of FIG. 1.
Figure 3:
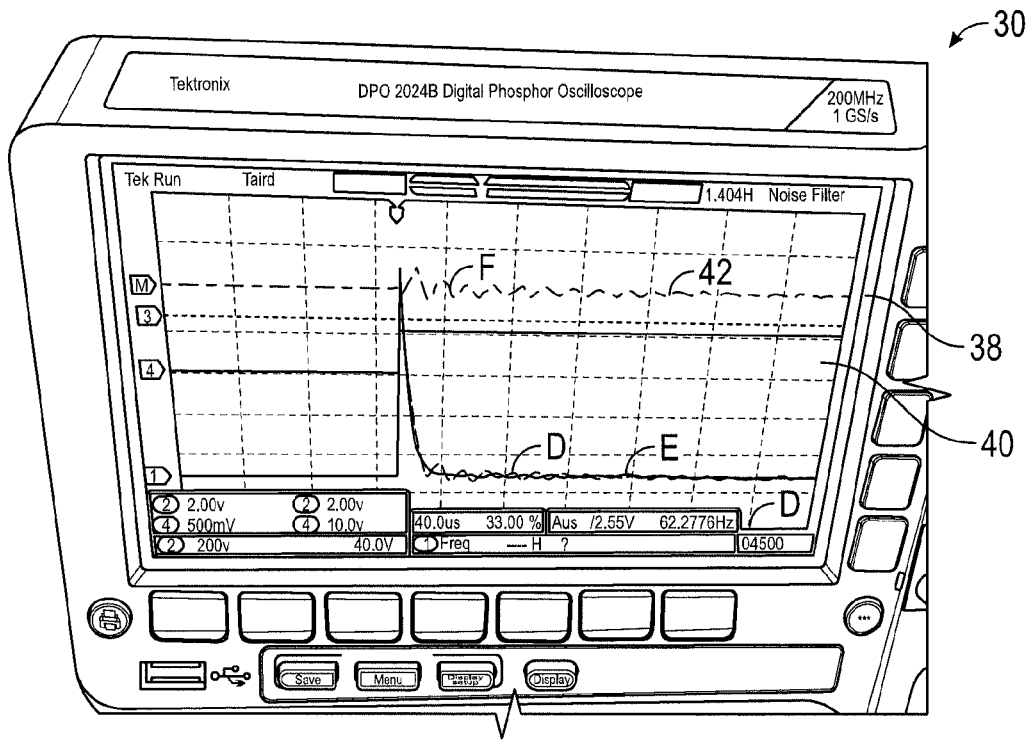
FIG. 3 is a display of a transfer curve of the system of FIG. 1, showing resonant frequency of the controlled optical component system.

As shown in FIGS. 2 and 3, in an embodiment, the display device 30 applies a transfer function to display the sensoriactuator signal received over the conductor 32 from the comparator 24 and displays the sensoriactuator signal in real time as a transfer curve indicative of a condition of the optical component system 10. In an embodiment, the transfer curve may be indicative of a condition or "health" of the controlled optical component 35 (FIG. 1). As will be described in greater detail, the display shown in FIG. 2, generally designated 36, may display a transfer curve representative of a frequency response of the controlled optical component 35, and the display shown in FIG. 3, generally designated 38, may display a transfer curve representative of a resonant frequency of the controlled optical component. In an embodiment, the current source 16 may provide electric current to the electrostrictive actuator 12 and the capacitor 14 in a pre-set pattern.

In an embodiment, the pre-set pattern may vary in frequency, as shown in FIG. 2. In that embodiment, the transfer curve shown in the display 36 may show frequency response across a pre-set frequency range. In an embodiment, the pre-set range may be below the resonant frequency of the controlled optical component 35. In one specific embodiment, the pre-set frequency range may be between 0 and 40 kilohertz (kHz). In an embodiment, the transfer curve shown in the display 36 may show frequency response as a rato of voltage input to the electrostrictive actuator 12 over conductor 18 from amplifier 16 to a voltage of the sensoriactuator signal from comparator 24 over conductor 32 plotted against frequency across the preset frequency range.

In another embodiment, the pre-set pattern may take the form of a square wave, shown as 40 in FIG. 3 in the display device 38 of FIG. 3. In that embodiment, the curve 42 shows the resonant frequency of the electrostrictive actuator 12 and optical element 22 of the controlled optical component 35. In the embodiment of FIG. 3, an error condition may be detected when a spacing between the peaks of the transfer curve 42 changes from a spacing between peaks of a baseline transfer curve, such as the transfer curve shown in FIG. 3.

Figure 4:
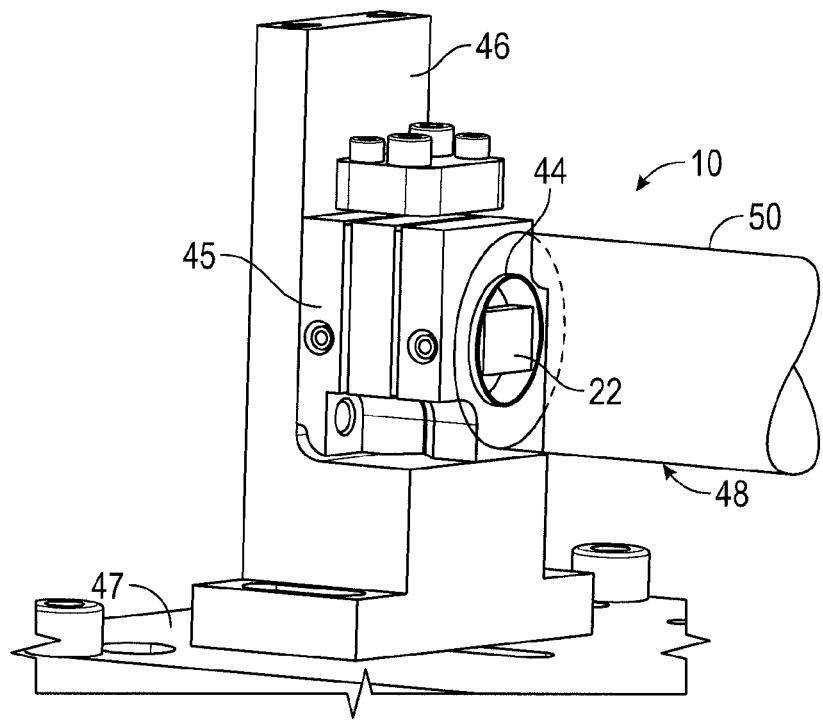
FIG. 4 is a perspective view of an embodiment of the controlled optical component system of FIG. 1, in which the controlled optical system is part of a sodium guidestar laser.
Figure 5:
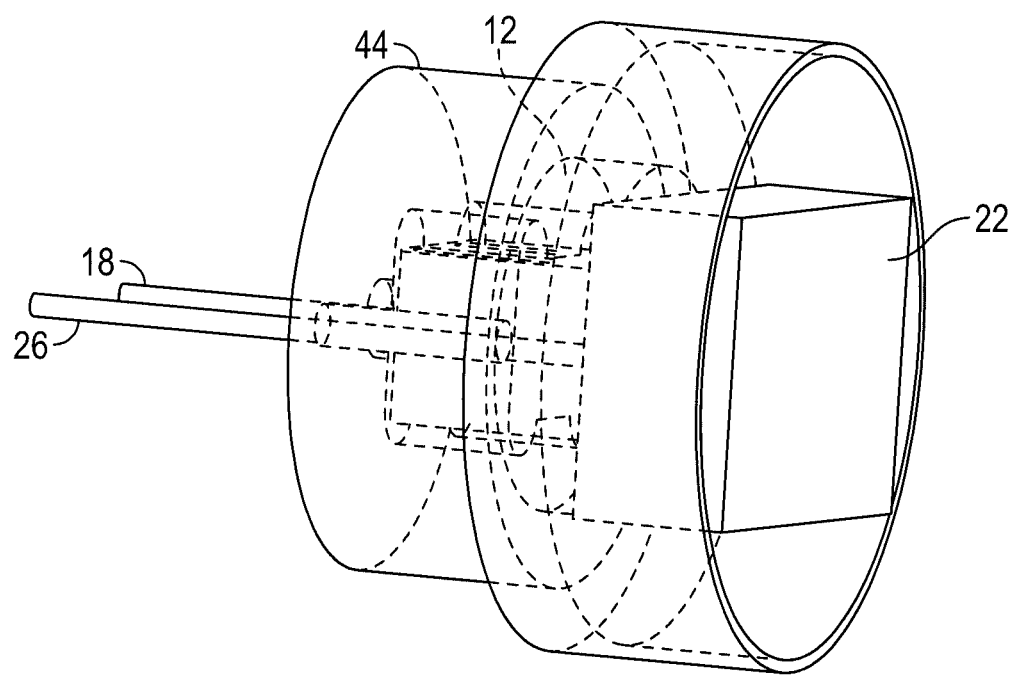
FIG. 5 is a perspective view of the piezoelectric actuator and mirror mounted in a mounting bracket of the optical mount of FIG. 4.

As shown in FIGS. 4 and 5, the electrostrictive actuator 12 may take the form of a piezoelectric actuator. In another embodiment, the electrostrictive actuator 12 may take the form of a piezoelectric stack actuator ("PZT"). The optical element 22 may take the form of a mirror, and in embodiments, the mirror may be selected from a focus mirror, a deformable mirror, and a tip-tilt mirror.

The PZT 12 may be mounted on a holder, generally designated 44, that also holds the optical element 22. As shown in FIG. 4, the holder 44, in an embodiment, may be received in a static adjustment retainer 45, which in turn is mounted on a bracket 46. The bracket 46 may be attached to a base 47. In an embodiment, the holder 44, static adjustment retainer 45, PZT (electrostrictive actuator 12) and mirror (optical element 22) may form part of a laser, generally designated 48, which in embodiments may be a FASOR sodium guidestar laser. The mirror/optical element 22 may be positioned at an end of the optical cavity 50 of the laser 48. The mirror/optical element 22 may be moved by the PZT 12 to control a length dimension of the optical cavity 50 of the laser 48.

As shown in FIG. 1, the electrostrictive actuator 12 and the capacitor 14 may be connected to ground 52, 54 by conductors 56, 58, respectively. In an embodiment, the system 10 may include a first resistor 60 connected on conductor 56 between the electrostrictive actuator 12 and ground 54, and a second resistor 62 on the conductor 58 between the capacitor 14 and ground 54. In an embodiment, the resistors 60, 62 may be low-resistance resistors, and may be matched in resistance.

In an embodiment, a method for monitoring the controlled optical component system 10, which may include a controlled optical component 35 having an electrostrictive actuator 12 coupled to an optical component 22, may include transmitting a direct current from the amplifier 16 through conductors 18 and 20 to the electrostrictive actuator and the matched capacitor 14, and receiving the first output current from the electrostrictive actuator over a conductor 26, and a second output current from the capacitor over conductor 28 by the comparator 24. The comparator may output a differenced sensoriactuator signal over conductor 32 proportional to the difference between the first output current and the second output current. The sensoriactuator signal transmitted over conductor 32 represents a current associated only with movement of the electrorestrictive actuator 12 and the attached optical element 22.

The substraction of the current traveling through the electrostrictive actuator 12 by the comparator 24 caused by the current from matched capacitor 14 over conductor 28 removes that portion of the current transmitted over conductor 26 from the electrostrictive actuator 12. The sensoriactuator signal outputted over conductor 32, in an embodiment, may be received by the display device 30 and shown on display 36 as transfer curve A. In this embodiment, the display plots the transfer curve A over a pre-set frequency range, which in the embodiment shown is a sine wave having frequencies between 0 and 40 kHz.

On the ordinate, that is, the Y-axis of the display 36, the values represent a dimensionless ratio of the magnitude of the voltage inputted to the electrostrictive actuator 12 over conductor 18 from amplifier 16, and the sensoriactuator signal transmitted over conductor 32 from comparator 24. In embodiments, the value for the voltage inputted into the electrostrictive actuator 12 may be a stored value in the display device 30, or may be transmitted to the display device 30 from the voltage source 16 over conductor 63. In the embodiment shown in FIG. 2, if an error condition occurs, the transfer curve may appear as curve B, which may include a peak indicated at C that is not present in curve A. This peak at C may indicate a malfunction or error condition existing with either the electrostrictive actuator 12, the mirror/optical component 22, or both. In an embodiment, the curve indicated at A may be in the form of a baseline transfer curve that may be developed by performing a first iteration of the aforementioned method.

In the embodiment shown in FIG. 3, the display device 30 may display a square wave 40 that results in a transfer curve indicated at D. Transfer curve D may consist of the resonant frequency of the controlled optical component 35, which may consist of the electrostrictive actuator 12 and the optical element 22, as well as the current flowing through the electrostrictive actuator. The curve E represents the current flowing through matched capacitor 14. The two are differenced and the resulting resonant frequency transfer curve 38 shows the resonant frequency of the electrostrictive actuator 12 and optical component 22. The curve 38 in display device 30 in FIG. 3 may represent a resonant frequency of the controlled optical component 35 functioning normally. A subsequent iteration of the square wave 40 after use of the laser 48 may result in a second curve (not shown) that may be similar in appearance to the transfer curve 38, except that the peaks may differ in spacing from the peaks shown in curve 38. Such a difference spacing of peaks may indicate that an error condition exists with the controlled optical component 35.

With either embodiment, the method and system 10 may be used to indicate an error condition existing with a controlled optical component 35 of a type having an electrostrictive actuator 12 coupled to an optical component 22. This may enable error detection of the electrostrictive actuator 12 and/or optical component 22 without the necessity of dissembling the device in which the components are mounted, such as the device laser 48 shown in FIGS. 4 and 5. This in situ, self-diagnostic method and system may provide a cost-saving and time-saving system and method for diagnosing malfunctions in controlled optical component systems.

Embodiments of the invention include a health monitoring technique for the only moving part of the sodium guidestar laser. This laser design recently recorded record breaking power and quality of a sodium laser to provide a guidestar for a terrestrial telescope. The guidestar enables the telescope to achieve close to diffraction limited performance without the need for a natural guidestar at or near the target of interest. As the only moving part in the guidestar, the piezoceramic actuated mirror is a critical component to both qualify and monitor health and status of. A self-sensing technique is described to provide in situ monitoring of the device.

Embodiments of this invention help to assess initial builds of the device for quality and to establish a healthy frequency response for comparison throughout the device lifetime as the piezoceramic actuator in a guidestar is the most likely part to have issues. Embodiments of the present invention provide in situ health monitoring of a critical device that is the least reliable part in a complex system. The present invention does not require an expensive complex optical sensor like an interferometer or a laser vibrometer which would be necessary to get similar quality measurements. These are expensive and require de-integration of a part that is buried in the guts of a complex laser system.

While the forms of apparatus herein described constitute preferred embodiments of the disclosed controlled optical component system, it is to be understood that the system is not limited to these precise forms of apparatus, and that changes may be made therein without departing from the scope of the invention.

What is claimed is:

1. A self-monitoring controlled optical component system comprising:
   an electrostrictive actuator;
   a capacitor matched in capacitance to the electrostrictive actuator;
   a current source connected to the electrostrictive actuator and to the capacitor that supplies an electric current to the electrostrictive actuator and to the capacitor;
   an optical element connected to be moved by the electrostrictive actuator; and
   a comparator connected to receive a first output current from the electrostrictive actuator and a second output current from the capacitor, and output a differenced sensoriactuator signal proportional to the difference between the first output current and the second output current, the sensoriactuator signal representing a current associated with movement of the optical element by the electrostrictive actuator.

2. The system of claim 1, wherein the current source provides the electric current to the electrostrictive actuator and to the capacitor in a pre-set pattern.

3. The system of claim 2, further comprising a display device connected to receive the sensoriactuator signal and apply a transfer function to display the sensoriactuator signal as a transfer curve indicative of a condition of the optical component system; and wherein the transfer curve is selected from a display of frequency response of the optical element and the electrostrictive actuator, and a display of a resonant frequency of the optical element and the electrostrictive actuator.

4. The system of claim 3, wherein the pre-set pattern varies in frequency and the transfer curve shows the frequency response across a pre-set frequency range.

5. The system of claim 4, wherein the pre-set frequency range is between 0 and 40 kHz.

6. The system of claim 4, wherein the transfer curve shows the frequency response as a ratio of voltage input to the electrostrictive actuator to a voltage of the sensoriactuator signal plotted against frequency across the pre-set frequency range.

7. The system of claim 3, wherein the pre-set pattern includes a square wave and the transfer curve shows a resonant frequency of the electrostrictive actuator and the optical element.

8. The system of claim 3, wherein the resonant frequency of the optical element shows an error condition when a spacing between peaks of the transfer curve changes from a spacing between peaks of a baseline transfer curve.

9. The system of claim 1, wherein the electrostrictive actuator is a piezoelectric actuator.

10. The system of claim 1, wherein the electrostrictive actuator is piezoelectric stack actuator.

11. The system of claim 1, wherein the optical element is selected from a focus mirror, a deformable mirror, and a tip-tilt mirror.

12. The system of claim 9, wherein the electrostrictive actuator is mounted on a holder that holds the optical element.

13. The system of claim 12, wherein the holder is attached to an optical mount.

14. The system of claim 13, wherein the optical mount is part of a laser; and
   wherein the optical element is moved by the piezoelectric actuator to control a length of an optical cavity of the laser.

15. The system of claim 14, wherein the laser is a sodium guidestar laser.

16. The system of claim 1, wherein the electrostrictive actuator and the capacitor are connected to a ground.

17. The system of claim 16, further comprising a first resistor positioned between the electrostrictive actuator and the ground, and a second resistor positioned between the capacitor and the ground.

18. A method for self-monitoring a controlled optical component system of a type having an electrostrictive actuator coupled to an optical component, the method comprising:
   passing a current from a current source through the electrostrictive actuator and through a capacitor connected to the current source and matched in capacitance to the electrostrictive actuator;
   receiving a first output current from the electrostrictive actuator and a second output current from the capacitor by a comparator, and the comparator outputting a differenced sensoriactuator signal proportional to the difference between the first output current and the second output current, the sensoriactuator signal representing a current associated with movement of the optical component by the electrostrictive actuator;
   applying a transfer function to the sensoriactuator signal, and displaying the sensoriactuator signal as a transfer curve indicative of a condition of the controlled optical component system; and
   comparing the transfer curve to a baseline transfer curve to determine a condition of the controlled optical component system.

19. The method of claim 18, further comprising developing the baseline transfer curve by performing a first iteration of the method.

* * * * *